2 Sheets—Sheet 1.

J. GRIMM.
STRAW-CUTTER.

No. 171,562. Patented Dec. 28, 1875.

Witnesses:
J. W. Herthel
Chas. P. Meisner

Inventor:
John Grimm
per Herthel & Co.
Attys.

2 Sheets—Sheet 2.

J. GRIMM.
STRAW-CUTTER.

No. 171,562. Patented Dec. 28, 1875.

Witnesses:
J. W. Herthel,
Chas. F. Weisner.

Inventor:
John Grimm
per Herthel & Co.
Attys.

N. PETERS, PHOTO-LITHOGRAPHER, WASHINGTON, D C.

UNITED STATES PATENT OFFICE.

JOHN GRIMM, OF ST. LOUIS, MISSOURI.

IMPROVEMENT IN STRAW-CUTTERS.

Specification forming part of Letters Patent No. 171,562, dated December 28, 1875; application filed July 15, 1875.

*To all whom it may concern:*

Be it known that I, JOHN GRIMM, of St. Louis, Missouri, have invented an Improved Feed-Cutting Machine, of which the following is a specification:

The object of this invention is to form an improved feed-cutting machine, by the use whereof hand, steam, or other ordinary power can be applied, and the operation of which will insure a perfect manner of feeding the material; further, be adapted in its operation to suit the quality or nature and quantity of the fed material, as well as achieve a perfect cutting of the same, and otherwise possess advantages of durability of construction, reliability of work, with a saving of time, labor, and expense.

The nature thereof of this invention consists in the construction and combination of the various parts, to operate in the manner as hereinafter will more fully appear.

Figure 1:
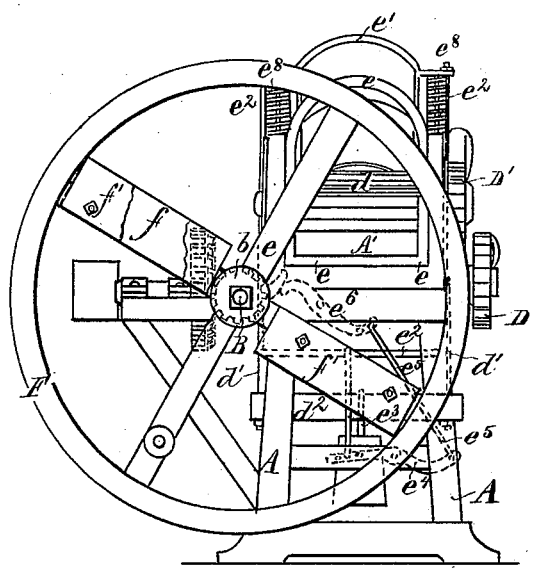
Figure 2:
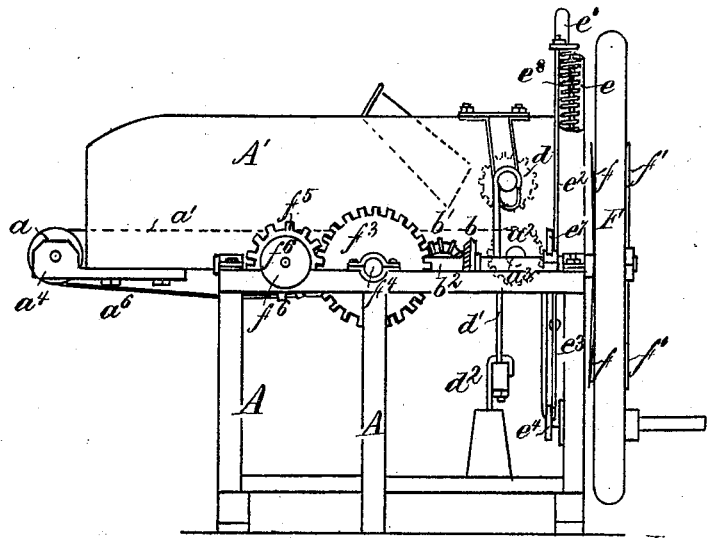
Figure 3:
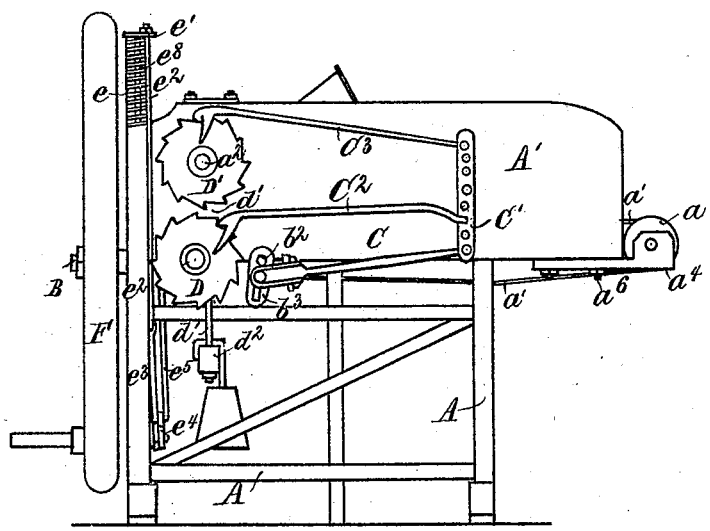
Figure 4:
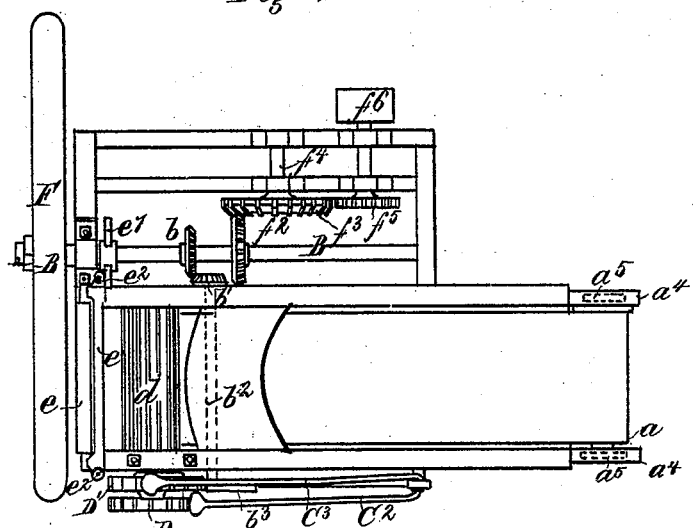

Of the drawing, Sheet 1, Figure 1 is a front elevation. Fig. 2 is a side elevation. Sheet 2, Fig. 3 is a side elevation. Fig. 4 is a top plan.

A is the frame of the machine. Top of this is the feed trough or box A', as usual. The back feed-roller $a$ connects, by endless belt $a^1$, to the forward lower feed-roller $a^2$, this latter roller being supported to turn, by its transverse shaft $a^3$, in proper bearings in the trough A'. (See Figs. 2, 3, 4.)

In order to lengthen or shorten the distance between the feed-rollers $a$ $a^2$ according to belt requirements, I support said roller $a$ in a movable frame, $a^4$. (See Figs. 2, 3, 4.) The frame $a^4$ has an elongated slot, $a^5$, through which a set-screw, $a^6$, passes, in order to secure said frame and its roller in required position to the under side of the box A', and as shown more clearly in Fig. 4. The belt can thus be kept at all times sufficiently taut, and the parts changed to suit the belt, as occasion requires. The belting and feed-rollers are operated by the main shaft B, (see Figs. 1, 2, 4,) and this can be operated by hand from the side or front, or both positions, at the same time, as well as by steam, horse, or other well-known power, as will hereafter appear.

To operate the feed devices, I secure on the main shaft B the bevel-gear $b$, and this meshes with a similar bevel-gear, $b^1$, (see Figs. 2 and 4,) which is on the cross-shaft $b^2$. (See dotted lines, Fig. 4.) The shaft $b^2$ has the crank $b^3$, in the elongated slot of which the connecting-bolt of the pitman, can be secured in varying positions according to feed requirements, and as shown in Fig. 3. The pitman C connects to the lower end of a vibrating arm, C$^1$, which has different holes, and is pivoted properly to the side of the box. (See Figs. 3, 4.) In the different holes of the arm C$^1$, the driving-rods C$^2$ C$^3$ (see Fig. 3) can be secured, according to the length of feed-stroke required to be imparted to the feed devices. Hence, the lower connecting-rod C$^2$, by its pawl end, is arranged to drive the lower ratchet-wheel D, which is keyed to the end of the shaft that carries the lower forward feed-roller $a^2$. Similarly, the upper driving-rod C$^3$ engages an upper ratchet-wheel, D', the teeth of which are reverse to those of D, and which is keyed to the end of the shaft that carries the upper feed-roller $d$. (See Figs. 3 and 4.) When, therefore, the main shaft turns, the crank-shaft, by its pitman-connections, operates the lever-arm C$^1$, the movements of which, by means of the driving-rods C$^2$ C$^3$, operates the respective ratchet-wheels D D' in opposite directions, so that while the lower feed-rollers $a$ $a^2$ turn or feed in a forward direction, the upper roller $d$ turns in an opposite direction. The straw can, therefore, be fed according to the length of cut required, as the gearing or ratchet connections can readily be made to feed the distance of a tooth or more, and the crank-connection of pitman be changed also to suit. The upper feed-roller $d$ is vertically adjustable, for the purpose of allowing the feed material to be passed under it, yet bear sufficiently to retain the uncut feed, and prevent unequal surfaces of the feed from presenting themselves to the cutters. Therefore this roller-shaft rests in the slotted bearings down in each side of the box A'. (See Figs. 2 and 3.) Further, I connect said shaft, by side hangers $d^1$, to a cross-beam, $d^2$, from which is suspended a weight, as shown in Figs. 1, 2, 3. It is further essential that the fed material be held solidly down upon the cutting-edge of the trough to insure a better and more perfect cutting of the feed; also, that the parts to accomplish this end should not interfere with the proper feeding of the material. I provide, therefore, the feed-trough at its cutting-edge to have a metal frame, $e$, so secured as to cover the bottom edge, and also side edges, of said trough, as indicated in Figs 1, and 3, 4. A similar, but movable frame, $e^1$, slides vertically within the frame $e$, also shown in Figs. 1 and 3, 4. The sliding frame $e^1$ is guided vertically by its side projections moving in side grooves of the frame $e$. It is the bottom of the slide-frame $e^1$ that bears upon the feed; hence I further connect it near top to the side rods $e^2$, the unbroken bottom of which further connects to one end of a connecting-rod, $e^3$, and this has its other end pivoted to one end of a vibrating arm, $e^4$, which is pivoted properly to the frame A. The opposite end of the arm $e^4$ connects, by the rod $e^5$, to one end of a similar vibrating arm, $e^6$, which is likewise pivoted to the frame A under its feed-trough, and as shown in Fig. 1. This arm $e^6$ is finally operated by a tappet-wheel, $e^7$, which is keyed to the main shaft B, and as shown in Fig. 4. As the tappet-wheel is made to act upon the arm $e^6$, it raises one end of the lower arm $e^4$, causing this, therefore, to lower or draw downward the side rods $e^2$, and the sliding frame $e^1$, also. By this means the said frame $e^1$ is held down to press solidly upon the feed, preventing unequal cut lengths to take place, and said frame acts thus until the tappet-wheel is released, which takes place after every cut of each knife has been performed. $e^8$ are proper springs to facilitate the operation of the slide-frame $e^1$, and serve to cause said frame to return to original position. The fly-wheel F has cutter-blades $f$. (See Figs. 1 and 2.) On both sides of cutter-blades are guide-plates $f^1$. These serve and cause the cut material to fall directly and prevent undue scattering of same.

The application of the power source is as follows: On the main shaft is a bevel-gear, $f^2$, which meshes with a large bevel-gear, $f^3$, its shaft $f^4$ being properly supported to turn in bearings on the frame A. This large gear $f^3$ further meshes with a small driving-gear, $f^5$, its shaft likewise supported in the frame A, and also carrying the belt-wheel $f^6$. (See Fig. 4.) By belting connection, therefore, to power source, the machine can be operated, and, as apparent, this power can be steam, horse, or water power. In place of the belt-wheel, a hand-crank can be substituted, and, as the fly-wheel has similar crank attachment, the machine can thus be operated by hand from the side or front, or both positions combined, and as before stated.

What I claim is—

In combination with the frame $e^1$, having the return-spring $e^2$, the connecting-rod $e^3$, vibrating rod $e^4$, rod $e^5$, vibrating arm $e^6$, and tappet $e^7$, as described.

In testimony of said invention I have hereunto set my hand.

JOHN GRIMM.

Witnesses:
WILLIAM W. HERTHEL,
CHAS. F. MEISNER.